(12) United States Patent
Bernoux et al.

(10) Patent No.: US 9,214,864 B2
(45) Date of Patent: Dec. 15, 2015

(54) SWITCH MODE POWER SUPPLY WITH SWITCHABLE OUTPUT VOLTAGE POLARITY

(75) Inventors: Beatrice Bernoux, Tournefeuille (FR); Josef Drobnik, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/397,188

(22) PCT Filed: Apr. 26, 2012

(86) PCT No.: PCT/IB2012/001289
§ 371 (c)(1),
(2), (4) Date: Oct. 25, 2014

(87) PCT Pub. No.: WO2013/160718
PCT Pub. Date: Oct. 31, 2013

(65) Prior Publication Data
US 2015/0061612 A1    Mar. 5, 2015

(51) Int. Cl.
*H02M 7/5388*    (2007.01)
*H02M 3/158*    (2006.01)
*H02M 7/483*    (2007.01)

(52) U.S. Cl.
CPC .............. *H02M 3/158* (2013.01); *H02M 7/483* (2013.01); *H02M 7/5388* (2013.01)

(58) Field of Classification Search
CPC ......... H02M 7/48; H02M 7/53; H02M 7/537; H02M 7/538; H02M 7/53803; H02M 7/53806; H02M 7/5381; H02M 7/5387; H02M 2007/4811; H02M 2007/53878; H02M 2007/5388; G06F 1/40

USPC ......... 363/123, 131, 132, 133, 134, 135, 136, 363/139, 17; 323/220, 222, 223, 225, 271, 323/282

See application file for complete search history.

(56) References Cited

U.S. PATENT DOCUMENTS

| | | | |
|---|---|---|---|
| 7,157,887 B2 | 1/2007 | Drobnik | |
| 2006/0049814 A1* | 3/2006 | Drobnik | H02M 3/158 323/282 |
| 2008/0043500 A1* | 2/2008 | Asano | H02M 7/48 363/56.12 |

(Continued)

OTHER PUBLICATIONS

International Search Report and Written Opinion correlating to PCT/IB2012/001289 dated Jan. 28, 2013.

(Continued)

*Primary Examiner* — Adolf Berhane
*Assistant Examiner* — Jye-June Lee (57) ABSTRACT

A switch mode power supply has a first and second branch of an inductive element; a first switching element and a second switching element connected in series. Both branches are coupled to a power source in parallel. A controller controls said switching elements for operating said switch mode power supply in a plurality of consecutive time periods, wherein more than two of said switching elements are closed, i.e. at least one in each branch. The power supply has a polarity switching element coupled between said branches for receiving a pulsed voltage for providing an output voltage of a switchable polarity. The controller receives a feedback signal corresponding to the output voltage, compares the feedback signal to a reference waveform, and controls said switching elements and the polarity switching element in dependence of said comparing for generating the output voltage according to the reference waveform.

19 Claims, 10 Drawing Sheets

(56) References Cited

U.S. PATENT DOCUMENTS

| | | | |
|---|---|---|---|
| 2011/0019448 A1* | 1/2011 | Miyake | H02M 7/5387 363/123 |
| 2011/0075455 A1* | 3/2011 | Sigamani | H02M 7/48 363/71 |
| 2014/0153298 A1* | 6/2014 | Kazanbas | H02M 5/458 363/37 |

OTHER PUBLICATIONS

Yu Xiong et al: "A New Single-Phase Multilevel Current-Source Inverter", 2004 IEEE Applied Power Electronics Conference and Exposition, APEC 04, IEEE, Anaheim, CA, USA, vol. 3, Feb. 22, 2004, pp. 1682-1685.

* cited by examiner

SWITCH MODE POWER SUPPLY WITH SWITCHABLE OUTPUT VOLTAGE POLARITY

FIELD OF THE INVENTION

This invention relates to electrical power systems. More specifically, the invention is in the field of switch mode power supplies.

BACKGROUND OF THE INVENTION

U.S. Pat. No. 7,157,887 describes direct amplitude modulation for switch mode power supplies. The switch mode power supply comprises a first branch of a first inductive element; a first switching element and a second switching element connected in series, and a second branch of a second inductive element; a fourth switching element and a third switching element connected in series. Both branches are coupled to a power source in parallel. A load is connected between the braches, in between the connected first and second switching element and the third and fourth switching element. The switch mode power supply operates in a plurality of consecutive time periods, wherein more than two of said switching elements are closed, i.e. at least one in each branch. For example in such a period the first branch delivers power to the load from the conductive element, whereas the inductive element in the second branch is simultaneously charged from the power source.

Due to the simultaneous operation of both branches, also called direct amplitude modulation (DIRAM), a controllable power boost is achieved, which enable increasing the output voltage. Such output voltage has a square-wave shape of both polarities, which is applicable to rectification. After rectification a smooth DC voltage is achieved. However, when the switch mode power supply has to deliver a specific voltage, the output voltage cannot be controlled accurately.

SUMMARY OF THE INVENTION

The present invention provides a switch mode power supply as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In an embodiment, the switch mode power supply comprises a first inductive element having a first end and a second end; a first switching element having a first end and a second end, wherein said first end of said first switching element is connected to said second end of said first inductive element; a second switching element having a first end and a second end, wherein said first end of said second switching element is connected to said second end of said first switching element; a second inductive element having a first end and a second end; a third switching element having a first end and a second end; and a fourth switching element having a first end and a second end, wherein said first end of said fourth switching element is connected to said second end of said second inductive element, and wherein said second end of said fourth switching element is connected to said first end of said third switching element. A first power source terminal is connected to said first end of said first inductive element and said first end of said second inductive element, and a second power source terminal connected to said second end of said second switching element and said second end of said third switching element. A controller is arranged for controlling said switching elements for operating said switch mode power supply in a plurality of consecutive time periods, during at least one of said plurality of consecutive time periods more than two of said first to fourth switching elements being closed, for providing a pulsed voltage between said second end of said first switching element and said second end of said fourth switching element. Furthermore, the power supply comprises a polarity switching element coupled to said second end of said first switching element and said second end of said fourth switching element for receiving the pulsed voltage for providing an output voltage of a switchable polarity. The controller is arranged for receiving a feedback signal corresponding to the output voltage via a feedback element, comparing the feedback signal to a reference waveform, and switching said first to fourth switching elements and the polarity switching element in dependence of said comparing for generating the output voltage corresponding to the reference waveform. The output voltage is generated at any required polarity and level by the coordinated controlling of the first to fourth switching elements in both branches having the respective inductive elements, and subsequently controlling the polarity switching element. Advantageously the output voltage is now controlled according to the reference waveform, e.g. a sine wave.

Optionally, the power supply comprises a transformer having a primary winding connected to said second end of said first switching element and said second end of said fourth switching element for receiving the pulsed voltage, and a secondary winding connected to the polarity switching element The transformer provides isolation between the voltage source and connected elements at the primary side, and the output voltage generated at the secondary side. Furthermore such transformer may provide a transformation (up or down)

function, to provide an output voltage as required by the application. Advantageously the transformer operates at the carrier (switching frequency) defined by the DIRAM topology. Since the carrier frequency is at least ten times the output frequency, the size reduction of such transformer is significant when compared to a transformer operating at the frequency of the output sine wave.

Optionally, the secondary winding comprises a nominal voltage terminal and at least one intermediate voltage terminal providing an intermediate secondary voltage lower than the nominal voltage, and the polarity switching element comprises at least one intermediate switching element coupled to the intermediate voltage terminal, and the controller is arranged for switching on the intermediate switching element during a low voltage part of the reference waveform. The reference waveform contains parts having a relatively high output voltage, e.g. the parts near the maxima and minima of a sine wave, and parts having a relatively low output voltage, e.g. the parts near the zero crossing. Advantageously the intermediate voltage enables the power supply to more accurately generate the required low voltages corresponding to the low voltage part of the reference waveform.

Optionally, the controller is arranged for operating said switch mode power supply in a pulse width modulation mode during a low voltage part of the reference waveform by, during at least one of said plurality of consecutive time periods more than two of said first to fourth switching elements being open, for providing the pulsed voltage having width modulated pulses. By operating in the pulse width modulation mode lower output voltages are generated, whereas for the higher output voltages the direct amplitude modulation (DIRAM) is used. Advantageously, by suitably selecting one of said operational modes, the power supply can efficiently provide the output voltage according to the reference waveform.

Optionally, the controller is arranged for adapting the length of the periods in said plurality of consecutive time periods in dependence of the reference waveform. Furthermore, the controller may be arranged for reducing the length of the periods in said plurality of consecutive time periods during a low voltage part of the reference waveform. Effectively the step size of the cycle is adapted. Advantageously, when the required waveform changes fast, such changes can be better matched by using a short period for each pulse, whereas during high voltage output a higher power output can be achieved by using a long period for each pulse.

Figure 1:
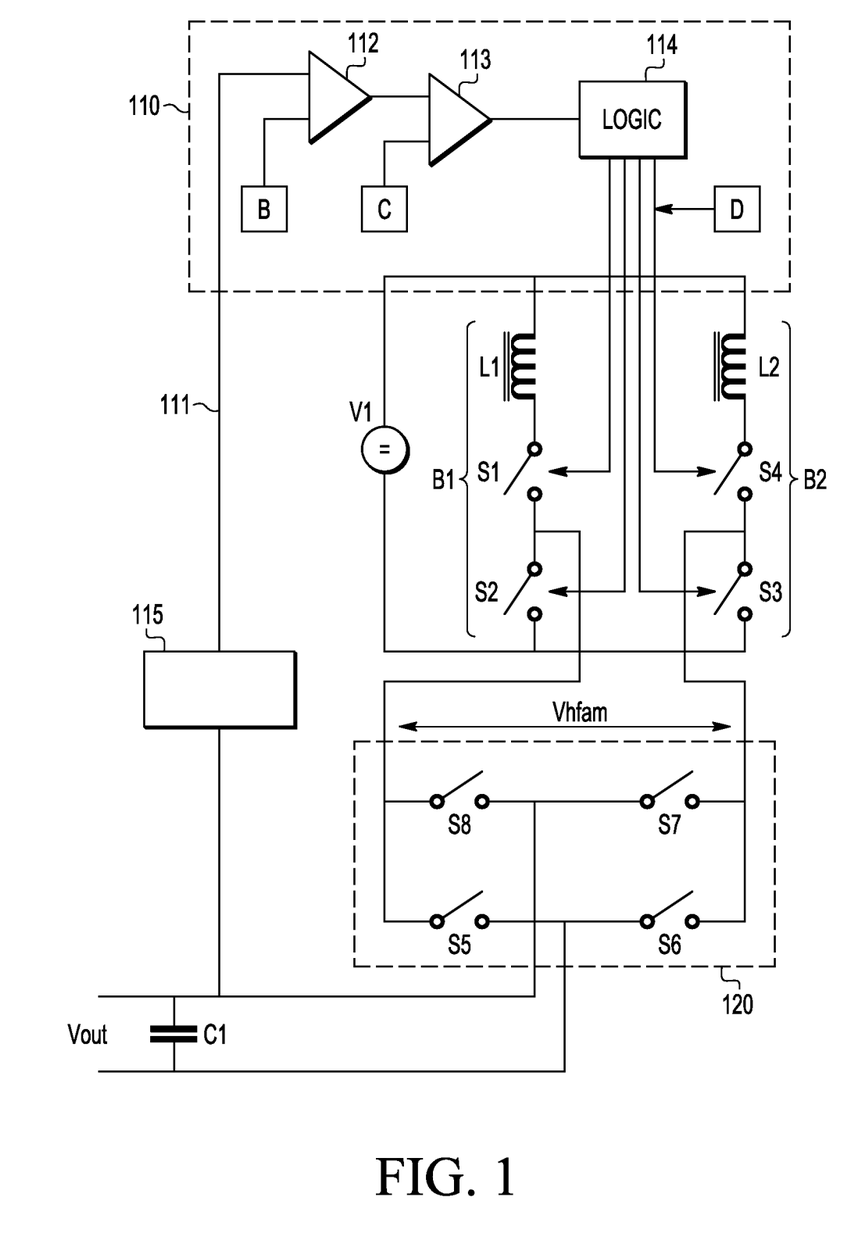
FIG. 1 schematically shows a circuit diagram of an example of a switch mode power supply.

FIG. 1 schematically shows a circuit diagram of an example of a switch mode power supply. The example of the switch mode power supply serves to generate a sine-wave output signal and has, in a first branch B1, a first inductive element L1 having a first end and a second end; a first switching element S1 having a first end and a second end. The first end of the first switching element is connected to the second end of the first inductive element. A second switching element S2 has a first end and a second end. The first end of the second switching element is connected to the second end of the first switching element. The switch mode power supply also has, in a second branch, a second inductive element L2 having a first end and a second end; a third switching element S3 having a first end and a second end; and a fourth switching element S4 having a first end and a second end, wherein the first end of the fourth switching element is connected to the second end of the second inductive element, and wherein the second end of the fourth switching element is connected to the first end of the third switching element. A first power source terminal is connected to the first end of the first inductive element L1 and the first end of the second inductive element L2, and a second power source terminal connected to the second end of the second switching element S2 and the second end of the third switching element S3. A power source V1 is shown connected to the power source terminals, but the power source needs not to be part of the power supply as such. The power source terminals may also be connected to an external power source. The power supply has a controller 110 including logic circuitry 114 arranged for controlling the switching elements to switch and for operating the switch mode power supply in a plurality of consecutive time periods of different switched configurations, during at least one of which more than two of the first to fourth switching elements are closed. Due to the switching a pulsed voltage, marked $V_{hfam}$ in FIG. 1, is generated between the second end of the first switching element and the second end of the fourth switching element, as discussed below in more detail.

The time periods are shorter than the period of the output signal, e.g. a sine wave, such that the output signal has the same shape as the envelope of the waveform provided at the output of the branches, i.e. in the example of FIG. 1 indicated with $V_{hfam}$.

The power supply further has a polarity switching element 120 coupled to the second end of the first switching element and the second end of the fourth switching element which, when the supply is in operation, receives the pulsed voltage and controls the polarity thereof. The output of the polarity switching element 120 is coupled to a capacitor C1 for providing an output voltage of a switchable polarity between the two sides of the capacitor. The polarity switching element 120 may include four on-off type switching elements S5, S6, S7 and S8 (as shown) to constitute an H-bridge type polarity switch, wherein a first polarity is activated when S5 and S7 are on (i.e. closed), while the inverse polarity is activated while S6 and S8 are on. Other configurations of switches can be used also, for example using two double through switches. The switches may be any suitable type of switches. In semiconductor devices, "single through" and mostly normally open switches such as FET, IGBT, etc can be used.

The controller 110 is arranged for receiving a feedback signal 111 corresponding to the output voltage via a feedback element 115. As shown, thereto the controller may have a comparing unit 112 having a first input coupled to the feedback signal and a second input coupled to a reference waveform, marked B, for comparing the feedback signal to the reference waveform. The reference waveform may be generated by the controller itself, e.g. a sine wave, or may be provided or synchronized to an external input signal. The comparing unit may be e.g. a comparator generating a logic output signal or a difference amplifier that generates a difference signal. The controller may comprise a further comparator unit 113 having a first input coupled to the difference signal, and a second input for receiving a periodic signal, marked C, e.g. a saw-tooth or triangular signal, for generating periodic control signals to be further processed by the logic circuitry 114 to control the switching elements during a sequence of periods as described below. Effectively, the switching of the first to fourth switching elements and the polarity switching element is controlled in dependence of the comparing for generating the output voltage corresponding to the reference waveform.

The control unit 110 may be implemented in any manner suitable for the specific implementation and various other circuit and control elements can be used in the control unit 110, for example a microcontroller having respective input circuits for detecting the feedback signal, generating the reference signal B and/or the saw-tooth signal C, and, optionally, an external reference signal.

The feedback element may include a rectifying element, for providing the feedback signal indicative of the amplitude of the output signal, while removing the polarity, i.e. the feedback signal corresponds to the amplitude of the absolute value of the output voltage. In such a case the reference signal can be provided similarly, i.e. having an absolute value and a polarity signal for controlling switching logic unit 114. Furthermore, the zero level of the feedback signal at the input of the comparing element 112 may be matched to a preferred zero level of the reference waveform, for example by including an opto-coupler or a difference amplifier.

Figure 2:
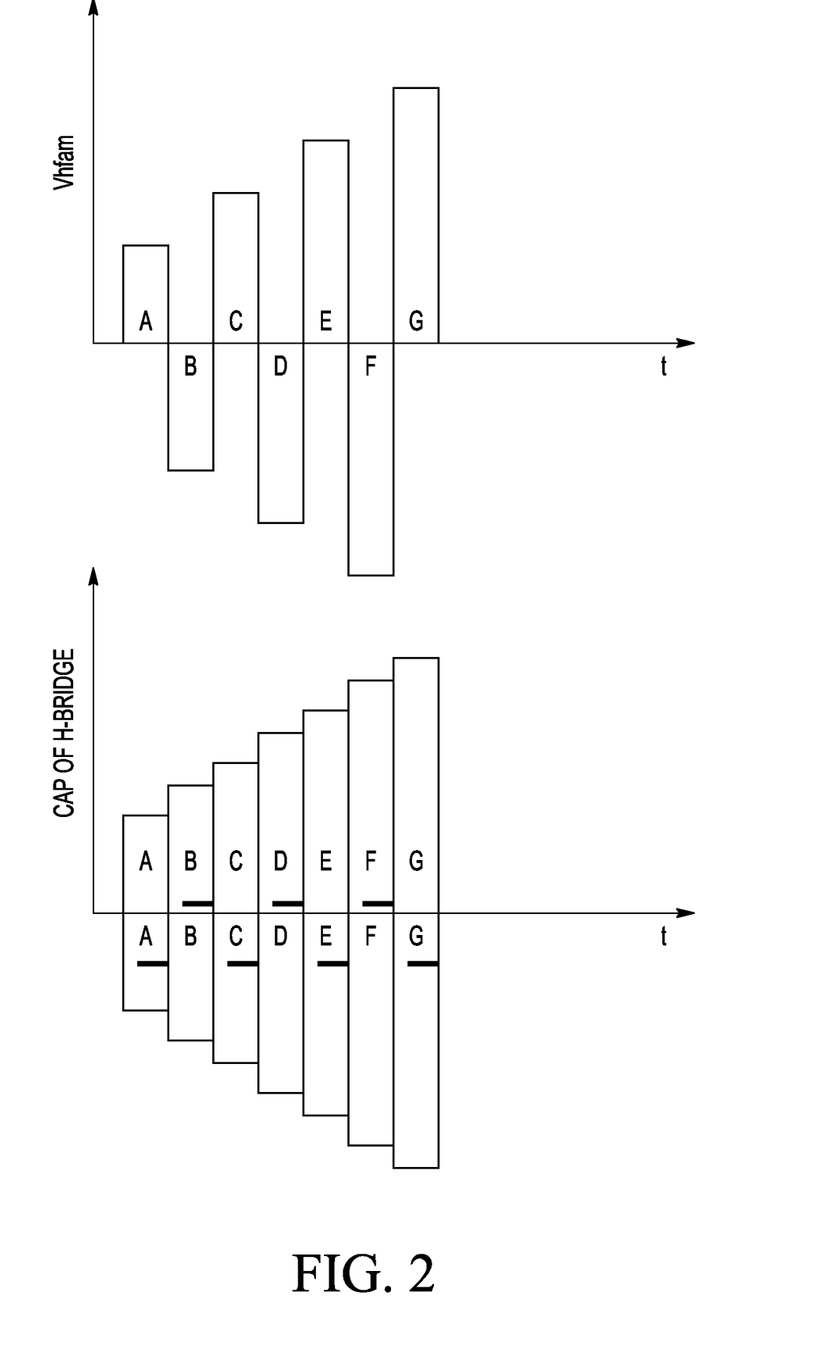
FIG. 2 shows signals of the power supply.

FIG. 2 shows signals of different nodes in the power supply as a function of time. The upper part of the Figure shows as a signal $V_{hfam}$, the high frequency amplitude modulated power wave-form provided on the output of the upper section of the circuit in FIG. 1, i.e. the upper figure depicts the product of the first H-bridge formed by switches S1 to S4. The lower section of FIG. 1 has the second H-bridge formed by switches S5 to S8 in the polarity switching element 120, which serves the purpose of either letting the waveform through without change or inverting the wave-form into second quadrant. The process will be governed by control logic 114, e.g. a microcontroller.

The lower part of FIG. 2 shows the switching capability of the second H-bridge. During the positive half cycle of the sine-wave all pulses will remain within the positive half-plane; meaning that each second pulse delivered from the first bridge will be inverted. The lower part of FIG. 2 indicates an inverted pulse by underlining of the letter. For example, in the positive half of the sine wave of the output signal pulses B, D and F are inverted. During the negative half cycle of the sine-wave of the output signal the opposite is true, and pulses A, C, E and G are inverted. Hence the second H-bridge performs the function of the polarity switch without requiring a transformer or rectifier diodes, which results in a better power density, and less weight. There is no galvanic isolation between input and output, and there is a higher resistance due to the connection of switches in series during any period of time, resulting in a higher Rdson voltage drop.

Figure 3:
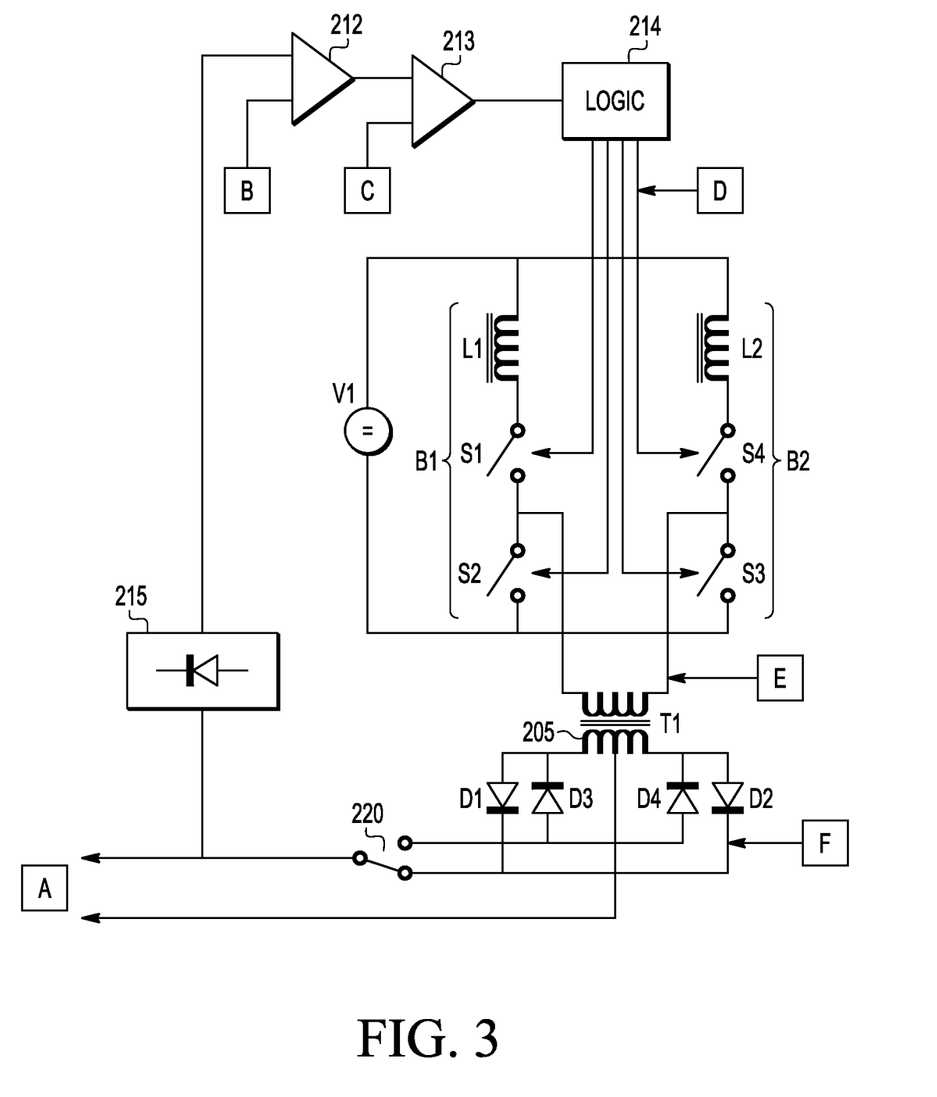
FIG. 3 shows a circuit diagram of an example of a switch mode power supply comprising a transformer.

FIG. 3 shows a circuit diagram of an example of a switch mode power supply comprising a transformer. The upper part of the schematic diagram is similar to FIG. 1, having both branches and the switches S1 to S4. The control section is arranged for receiving a feedback signal corresponding to the output voltage via a feedback element 215, which in this example rectifies the output signal and comprises a rectifier, in this example a diode. Optionally, the passive rectifiers on the secondary side of the transformer, e.g. D1-D4 in FIG. 3 or D1-D12 in FIG. 6 may be replaced with active switches or synchronous rectifiers, thereby enabling bi-directional operation of the inverter.

A comparing unit 212 has a first input coupled to the feedback signal and a second input coupled to a reference waveform, marked B, for comparing the feedback signal to the reference waveform, and generating a difference signal. A further comparator unit 213 has a first input coupled to the difference signal, and a second input for receiving a periodic signal, marked C, e.g. a saw-tooth or triangular signal, for generating periodic control signals to be further processed by the logic circuitry 214 to control the switching elements during a sequence of periods as described below.

The carrier high frequency pulsed voltage $V_{hfam}$ (marked E) is now coupled to the primary winding of a transformer T1 205. The secondary winding of the transformer is coupled to a bipolar rectifier formed by D1 to D4 and a polarity switch 220 capable of selecting the rectified voltage for generating the positive and negative half waves.

It is noted that the transformer enables replacement of a bulky low (output) frequency transformer because the much smaller high frequency transformer operates at the carrier frequency, which in the shown examples is the frequency of high frequency voltage $V_{hfam}$. The transformer performs the voltage step-down or step-up function along with galvanic isolation (functional and safety) between the input power source and the output.

Figure 4:
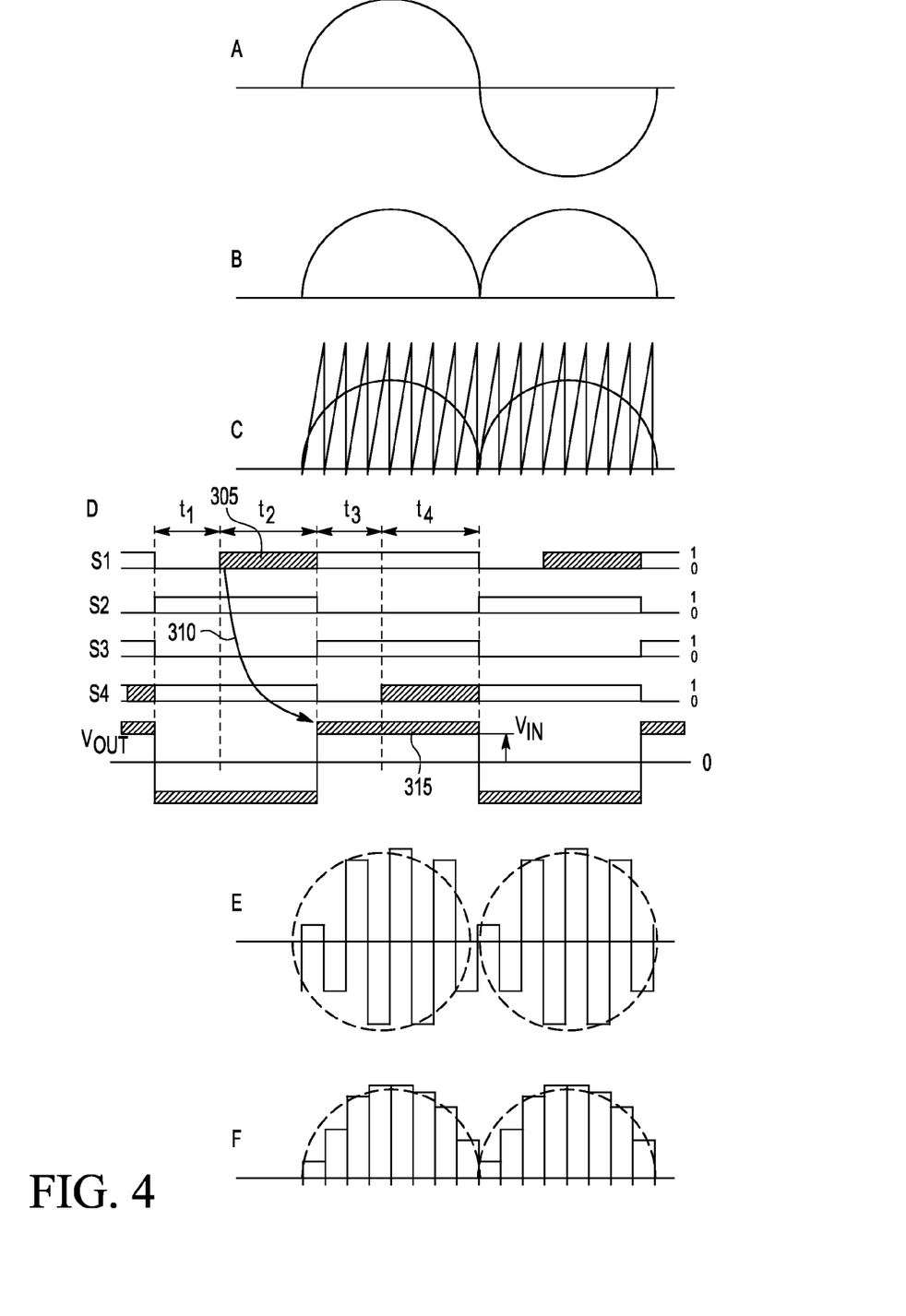
FIG. 4 shows waveforms of signals in a power supply.

FIG. 4 shows waveforms of signals in the power supply of FIG. 3. Waveforms at points labeled A-F in FIG. 3 are depicted. In FIG. 4, label A represents the desired power output, e.g. a sinusoidal waveform, B is a rectified reference waveform, C is graphical representation of a saw-tooth signal and the rectified reference signal for generation of a pulse width modulated (PWM) signal, D shows the operation of the direct amplitude modulation (DIRAM) topology in a sequence of periods, E shows the bipolar modulation, i.e. pulsed high frequency signal $V_{hfam}$, and F shows the rectified bipolar modulation signal as rectified by a rectifier formed by the diodes D1-D4, in this example by diodes D1 and D2. It is noted that the inverse rectified bipolar modulation signal is rectified by diodes D3 and D4. The polarity switch 220 is switched to select the required polarity.

The principle of operation of the example of FIG. 3 becomes clear from FIGS. 3 and 4. The sinusoidal signal A is rectified by the rectifier in the feedback element 115 and fed into comparator 112 where it is compared with the reference signal B which is also rectified half sine-waves. The product of this comparison is fed into the second comparator 113 where it is compared with the saw-tooth signal brought on terminal C. The result of this comparison is a pulse width modulated (PWM) signal which is then divided by control logic 114 into logic signals, e.g. binary ones and zeros as shown in section D, which control each respective power switch S1 . . . S4.

The controlled switching of the power switches S1-S4 generates amplitude modulated high frequency waveforms which are sent to the primary coil of the transformer T1. The pulsed signal brought to the transformer is bipolar and shown in FIG. 4 in section E where the dashed line indicates the modulation envelope. The pulsed signal enables proper operation of the transformer. The operation of the transformer at high carrier frequency enables substantial reduction of the transformer size. It is noted that the source power may also be derived from an input AC source, e.g. mains power. Hence a small and light weight sine wave converter may be provided that has both isolation and voltage conversion, which may serve to replace a heavy transformer. The secondary side of the transformer is attached directly to the bipolar rectifier D1-D4. The waveform on the output of this transformer is rectified to a positive and negative half wave. The proper polarity is selected by the polarity switch 220 and brought to output A. The polarity switch is operated synchronously to the polarity of the reference waveform.

The shown transformer has a secondary winding, also referred to as coil, with a center tap connected to one of the poles of the voltage output, the other pole being formed by one end of the bipolar rectifier in this example the parallel connection, in opposite direction, of diodes D3-D4. Alternatively the transformer may have a secondary winding without center tap. The winding may be coupled to an H-bridge polarity switch element like the polarity switch 120 shown in FIG. 1. The H-bridge switches are to be controlled synchronously to the pulses of the pulsed signal E for generating the output voltage of the required polarity, and respectively inverted based on the polarity of the reference waveform.

Figure 5:
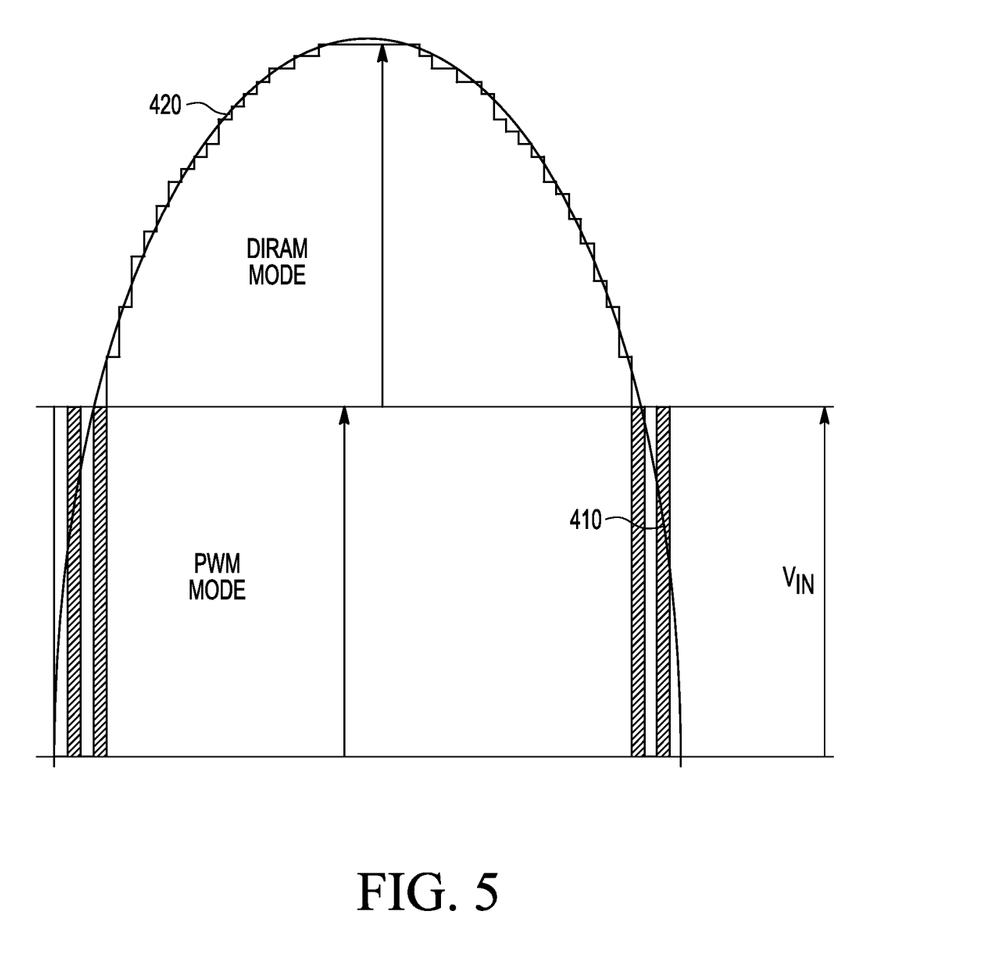
FIG. 5 shows an output waveform.

FIG. 5 shows an output waveform. The output waveform of the circuit of FIG. 1 or 3 is schematically depicted in detail in FIG. 5. An upper part 420 of the waveform is generated in DIRAM mode. Above the DC input voltage of power source D1 the output voltage is generated by micro steps to the top of the sine-wave and all the way back to the source voltage brought to the source terminals. Each micro step is a period in the sequence of periods as depicted in section D in FIG. 4, an amount of additional power being controlled by the time intervals t2 and t4 in such period, wherein three switches are closed. In the DIRAM mode, during the first period indicated in section D of FIG. 4, the switches S2 and S4 are closed, and L2 provides current to the load T1. Also, a third switch S2 is closed during a part of the first period. Hence the other inductive element L1 is charged by additional power, as indicated by the gray area 305 in period t2. The ratio of t2/(t1+t2) is called the DIRAM duty cycle, and determines the amount of additional power, which power is delivered to the load during the next period as indicated by arrow 310 and the gray area 315 in section D of FIG. 4.

Figure 6:
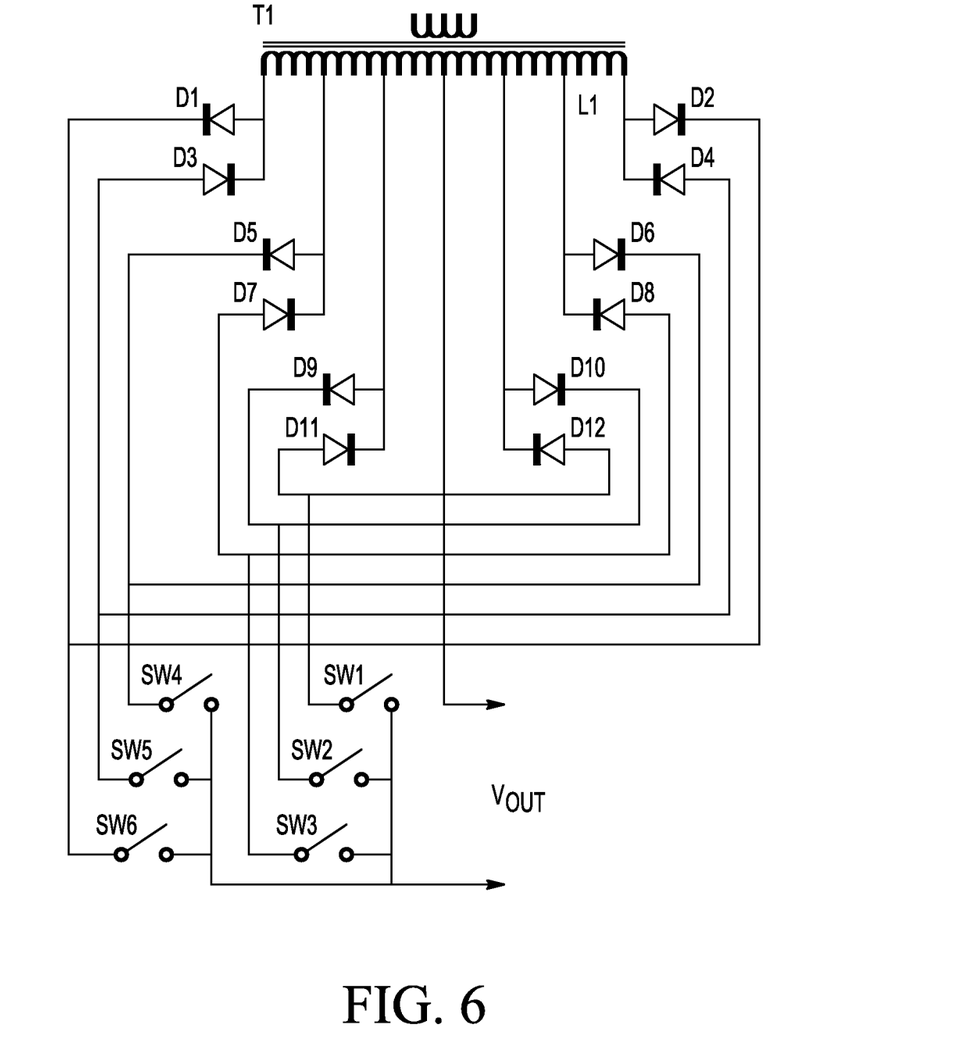
FIG. 6 shows a circuit diagram of an example of a multi-tap output section.

For an output voltage below the source voltage, the circuit is controlled to operate in pulse width modulation mode. The lower part 410 of the sine wave is a PWM signal that is generated at the output by controlling the pulse widths, i.e. by having an interval in the period in which the switches S1 . . . S4 are off to limit the output voltage FIG. 6 shows a circuit diagram of an example of a multi-tap output section. The Figure shows the transformer T1, connected like T1 205 in FIG. 3, but now having multiple intermediate connection taps for intermediate output voltages. The multiple taps on the secondary of the transformer T1 are coupled to multiple sets of switches via the respective bipolar rectifiers D1-D3, D5-D7, D9-D11, D2-D4, D6-D8, D10-D12. In the example a first set SW1 and SW2 connects the rectified voltage of lowest voltage taps to the output terminals of Vout, a second set SW3 and SW4 connects the rectified voltage of medium voltage taps, and a third set SW5 and SW6 connects the rectified voltage of highest voltage taps. The low voltage taps effectively produce a voltage lower than the source input voltage input while still operating in DIRAM mode, which voltage can be controlled more accurately. Also, when the intermediate or low taps are switched on, a higher current can be delivered to the output terminals. Use of multiple switches further enables better utilization, size reduction and heat distribution.

Figure 7:
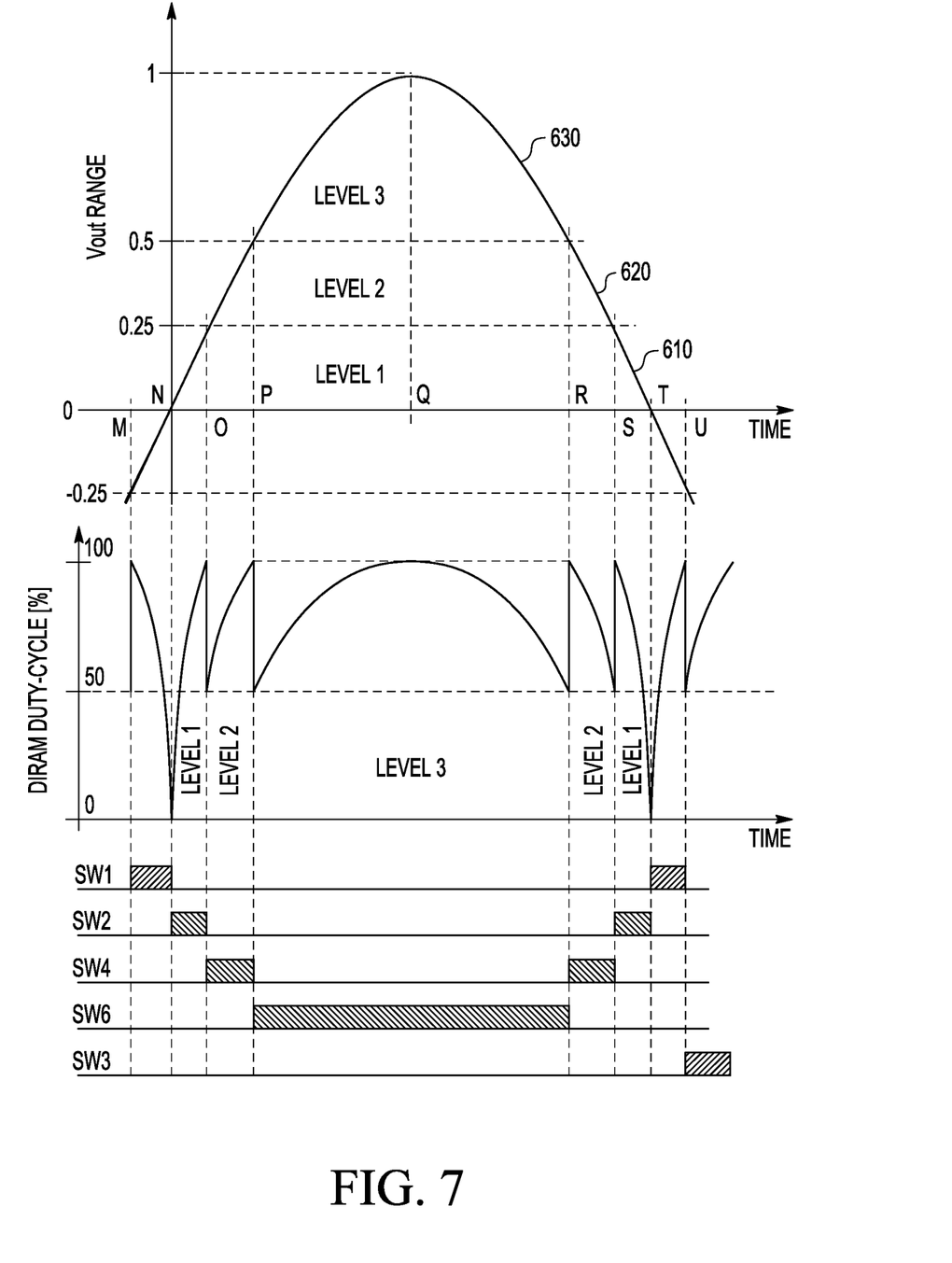
FIG. 7 shows timing and duty cycle of the multi-tap output section.

FIG. 7 shows the timing and duty cycle of the multi-tap output section. The upper graph shows the output voltage range of the multi-tap output section as described above, which is subdivided in three voltage levels, level 1 610, level 2 620, and level 3 630, as shown in the upper section of FIG. 6. The middle section of FIG. 6 shows the nominal primary voltage with respect to the duty cycle of the DIRAM control as shown in FIG. 3 section D. The bottom section shows the control signals for the switches SW2, SW4 and SW6 during the positive half of the sine wave, and SW1 and SW3 during the (parts shown of) the negative half.

Figure 8:
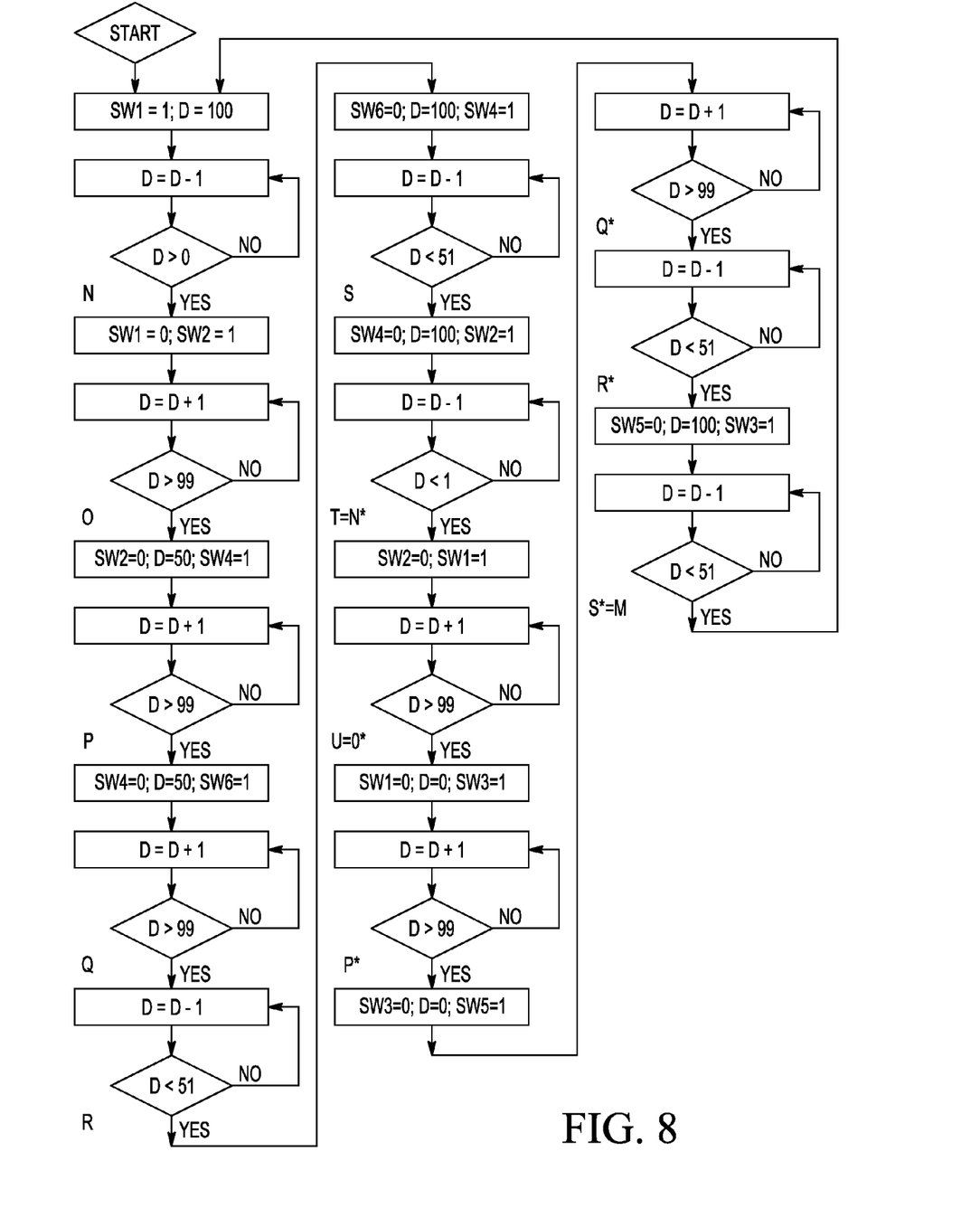
FIG. 8 shows a control flow chart of an example of a method for controlling a power supply having a multi-tap output section.

FIG. 8 shows a control flow chart of an example of a method for controlling a power supply having a multi-tap output section. The flowchart provides the method of controlling the switches for generating the signals as depicted in FIG. 7. In the Figure parameter D is a loop counter value for timing the respective periods as indicated by labels M-U, which, for example, are set to 100 clock cycles. At the start, indicated by label M, the last part of the negative half is generated, and SW1 is closed for 100 clock cycles. The further labels N, O, P, Q, R, S, T, U indicate the moments in time also shown in FIG. 7. Hence operation of the individual switches SW1, SW2, SW4, SW6, SW3, etc is described by the flowchart.

Figure 9:
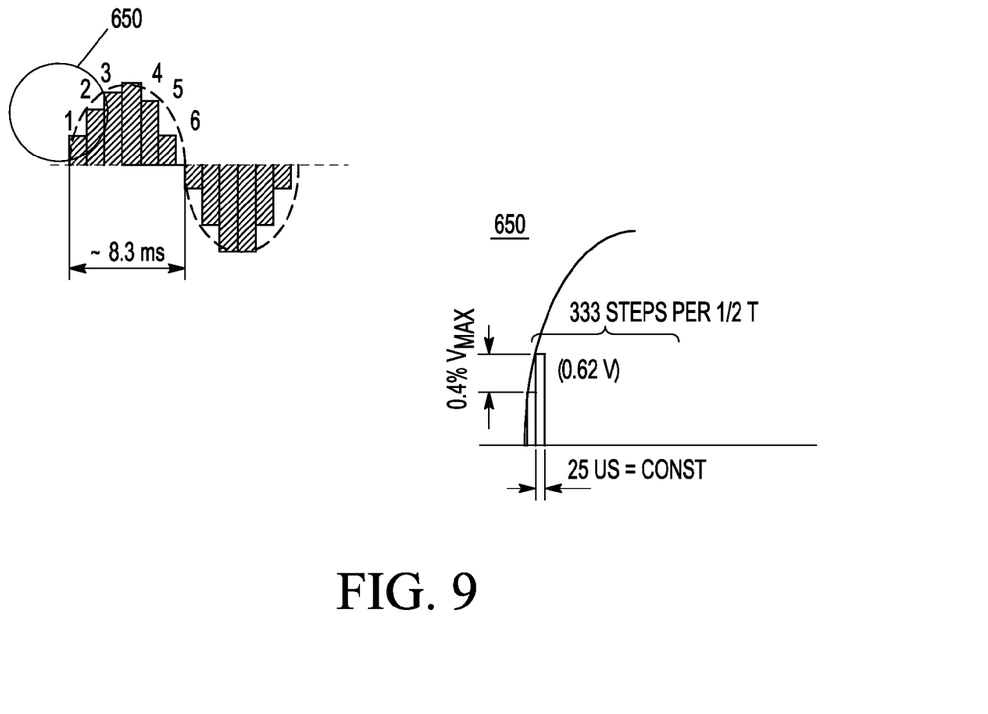
FIG. 9 shows voltage resolution of the output voltage.

FIG. 9 shows voltage resolution of the output voltage. In the left part the output voltage is schematically indicated to be generated by 6 pulses for the positive half (numbered 1-6). A detail 650 is indicated in the steep part of the half wave, near the zero crossing. The right part of the Figure shows the detail 650, having the steep part of the half sine wave as generated by fixed size pulses, in the example 333 pulses in each half sine wave time (indicated by "333 steps per ½ T using constant size of 25 μs"). Such output voltage is generated by steps that are constant in terms of time or frequency.

In an embodiment, the steps are modified accordingly to the modulation of the sine-wave. In the circuits of FIG. 1 or 3 a step size modulator is added, for example for controlling a clock frequency of the control logic 114 and/or the frequency of the saw tooth signal. Since the sine wave is the steepest close to the zero crossing and is most shallow on the top of the amplitude, the width of the individual pulses is made narrower close to the zero crossing and much wider approaching the maximum amplitude of the sine wave. This allows enhancing the resolution dramatically.

Figure 10:
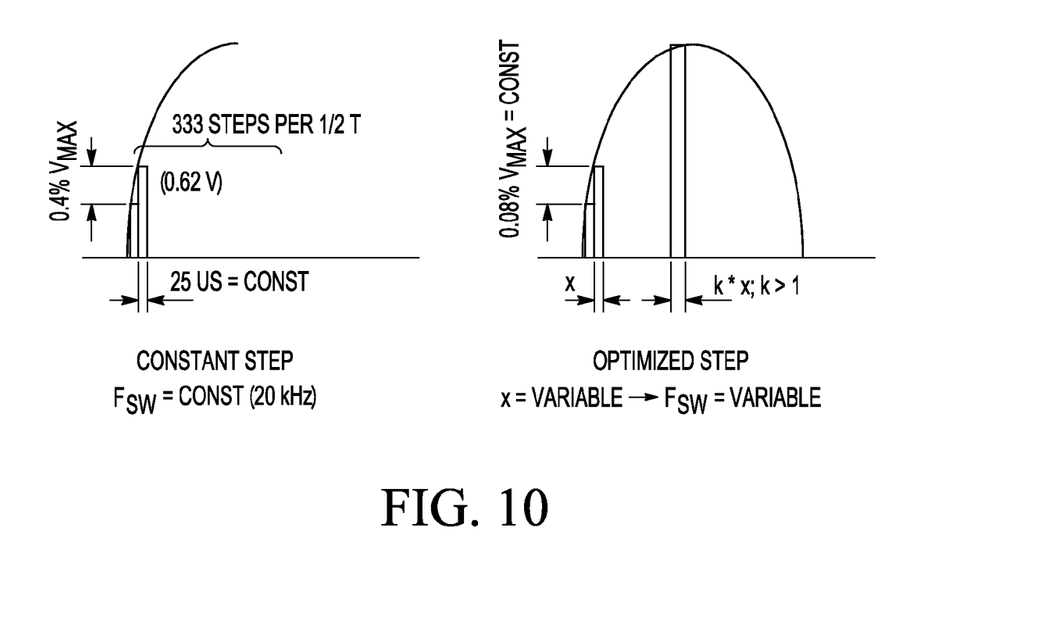
FIG. 10 shows a comparison between fixed and variable step size.

FIG. 10 shows a comparison between fixed and variable step size. The left part shows the output voltage according to the fixed size method, similar to FIG. 9. Here a constant step at a cycle switch frequency $F_{sw}$ of 20 kHz determines a constant resolution of 25 μs for the step size, and the delta (difference in the output voltage per step) will be around 0.4%. The right part shows an optimized step size. The step is optimized having a minimum step width×close to zero crossing and maximum of k*x (where k is substantially larger than 1, for example between 2 and 4) close to the maximum amplitude. In the example the resolution is increased to about 0.08%.

Figure 11:
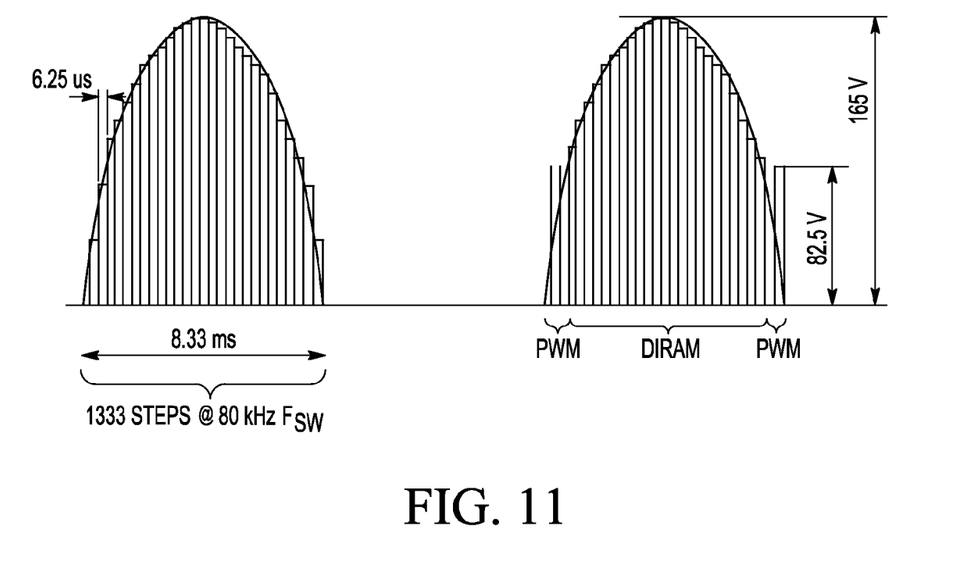
FIG. 11 shows a comparison of a power supply using PWM mode with a multi-tap version.

FIG. 11 shows a comparison of a power supply using PWM mode with a multi-tap version. The basic embodiments of the power supply, e.g. as shown in FIGS. 1 and 2, do combine the DIRAM operation in the high output voltage part of the sine wave, and PWM operation during a low output voltage part. The right part of FIG. 11 shows the regular operation. It is clear from FIG. 11 that only a limited part of the sine wave is constituted by PWM pulses, which depends on the input DC voltage. In the example, in the right part of FIG. 11, about 20% of the sine wave constitutes the low voltage part which is generated by PWM operation. Such combined DIRAM-PWM operation is acceptable to most applications, is less complex and less costly than the multi-tap system.

However, for some applications a more accurate sine wave near the zero crossing is required. The left part of FIG. 11 shows the operation of the multi-tap embodiment, operation in DIRAM micro stepping mode only, at a switching frequency of 80 kHz and a reference sine wave of 60 Hz.

In summary, the above described switched mode power supply provides a accurate conversion of input power, for example DC, into a sine wave or other periodic waveform having both positive and negative parts. Advantageously, clean sinusoidal waveforms can be supplied to electric motors, which results in reducing ripple torque, reduction battery ripple current, reduction of EMI, and/or reduction of acoustic noise. The system provides sine-wave synthesis, for example for inverters for EV/HEV or industrial applications with superior performance, industrial motor drives and other inverters including grid tie inverters, solar and wind inverters.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Furthermore, the semiconductor elements such as the controller 110, and/or the feedback circuit 115, and/or the switches S1 to S4 and S5 to S8, and rectifier diodes, may be suitably combined in one or more semiconductor devices. Hence a controller device for controlling a switch mode power supply may comprise circuitry for controlling the switching elements for operating the switch mode power supply, and for receiving a feedback voltage corresponding to the output voltage via a feedback element, for comparing the feedback voltage to a reference waveform, and switching the first to fourth switching elements and the polarity switching element in dependence of the comparing for generating the output voltage corresponding to the reference waveform.

A method for performing controlling a switch mode power supply may comprise code for controlling the switching elements for operating the switch mode power supply, for performing the functions as described above for the controller.

The controller device may comprise the first switching element, the second switching element, the third switching element, the fourth switching element, and/or the polarity switching element.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A switch mode power supply comprising: a first inductive element having a first end and a second end; a first switching element having a first end and a second end, wherein said first end of said first switching element is connected to said second end of said first inductive element; a second switching element having a first end and a second end, wherein said first end of said second switching element is connected to said second end of said first switching element; a second inductive element having a first end and a second end; a third switching element having a first end and a second end; a fourth switching element having a first end and a second end, wherein said first end of said fourth switching element is connected to said second end of said second inductive element, and wherein said second end of said fourth switching element is connected to said first end of said third switching element; a first power source terminal connected to said first end of said first inductive element and said first end of said second inductive element, and a second power source terminal connected to said second end of said second switching element and said second end of said third switching element; a polarity switching element coupled to said second end of said first switching element and said second end of said fourth switching element for receiving a pulsed voltage for providing an output voltage of a switchable polarity; a controller, arranged to control said switching elements for operating said switch mode power supply in a plurality of consecutive time periods, during at least one of said plurality of consecutive time periods more than two of said first to fourth switching elements being closed, for providing the pulsed voltage between said second end of said first switching element and said second end of said fourth switching element; and the controller is connected via a feedback element to an output, for receiving a feedback signal corresponding to the output voltage, and arranged to compare the feedback signal to a reference waveform, and switch said first to fourth switching elements and the polarity switching element in dependence of said comparing, for generating the output voltage corresponding to the reference waveform.

2. The power supply as claimed in claim 1, wherein the polarity switching element comprises a first and a second branch, each branch having a first on off type switch and a second on off type switch connected in series at a connection point, and the output voltage being provided between the connection points in the first and second branches.

3. The power supply as claimed in claim 1, further comprising:
   a transformer comprising a primary winding connected to said second end of said first switching element and said second end of said fourth switching element for receiving the pulsed voltage; and
   a secondary winding connected to the polarity switching element.

4. The power supply as claimed in claim 3, wherein the secondary winding comprises:
   a first winding section, for providing a secondary voltage of a first polarity; and
   a second winding section for providing a secondary voltage of a second polarity opposite to the first polarity, wherein the power supply comprises a rectifier element for rectifying the first and second secondary voltages, and the polarity switching element is connected to said rectifier element for receiving rectified first and second secondary voltages.

5. The power supply as claimed in claim 3, wherein the secondary winding comprises:
- a nominal voltage terminal and at least one intermediate voltage terminal for providing an intermediate secondary voltage lower than the nominal voltage, wherein
  - the polarity switching element comprises at least one intermediate switching element coupled to the intermediate voltage terminal, and
  - the controller is arranged to switch on the intermediate switching element during a low voltage part of the reference waveform.

6. The power supply as claimed in claim 1, wherein the controller is arranged for operating said switch mode power supply in a pulse width modulation mode during a low voltage part of the reference waveform by, during at least one of said plurality of consecutive time periods more than two of said first to fourth switching elements being open, for providing the pulsed voltage having width modulated pulses.

7. The power supply as claimed in claim 1, wherein the controller is arranged for adapting lengths of periods in said plurality of consecutive time periods in dependence of the reference waveform.

8. The power supply as claimed in claim 7, wherein the controller is arranged for reducing the length of the periods in said plurality of consecutive time periods during a low voltage part of the reference waveform.

9. The power supply as claimed in claim 1, wherein the reference waveform is a sine wave.

10. A method of controlling a switch mode power supply, the power supply comprising
- a first inductive element having a first end and a second end,
- a first switching element having a first end and a second end, wherein said first end of said first switching element is connected to said second end of said first inductive element,
- a second switching element having a first end and a second end, wherein said first end of said second switching element is connected to said second end of said first switching element,
- a second inductive element having a first end and a second end,
- a third switching element having a first end and a second end,
- a fourth switching element having a first end and a second end, wherein said first end of said fourth switching element is connected to said second end of said second inductive element, and wherein said second end of said fourth switching element is connected to said first end of said third switching element,
- a first power source terminal connected to said first end of said first inductive element and said first end of said second inductive element, and a second power source terminal connected to said second end of said second switching element and said second end of said third switching element, the method comprising:
  - operating said switch mode power supply in a plurality of consecutive time periods, during at least one of said plurality of consecutive time periods more than two of said first to fourth switching elements being closed, and providing a pulsed voltage between said second end of said first switching element and said second end of said fourth switching element;
  - providing an output voltage of a switchable polarity, comprising generating the output voltage corresponding to a reference waveform, wherein said generating comprises
    - receiving a feedback voltage corresponding to the output voltage via a feedback element,
    - comparing the feedback voltage to the reference waveform, and
    - switching said first to fourth switching elements and the polarity switching element in dependence of said comparing.

11. The method as claimed in claim 10, wherein the reference waveform is a sine wave.

12. A controller device for controlling a switch mode power supply, the switch mode power supply comprising:
- a first inductive element having a first end and a second end,
- a first switching element having a first end and a second end, wherein said first end of said first switching element is connected to said second end of said first inductive element,
- a second switching element having a first end and a second end, wherein said first end of said second switching element is connected to said second end of said first switching element,
- a second inductive element having a first end and a second end,
- a third switching element having a first end and a second end,
- a fourth switching element having a first end and a second end, wherein said first end of said fourth switching element is connected to said second end of said second inductive element, and wherein said second end of said fourth switching element is connected to said first end of said third switching element,
- a first power source terminal connected to said first end of said first inductive element and said first end of said second inductive element, and a second power source terminal connected to said second end of said second switching element and said second end of said third switching element, and
- a polarity switching element coupled to said second end of said first switching element and said second end of said fourth switching element for receiving a pulsed voltage and arranged to provide an output voltage of a switchable polarity, the controller device being arranged to
- control said switching elements for operating said switch mode power supply in a plurality of consecutive time periods, during at least one of said plurality of consecutive time periods more than two of said first to fourth switching elements are closed, for providing the pulsed voltage between said second end of said first switching element and said second end of said fourth switching element, and the controller device being connectable via a feedback element to an output for receiving a feedback voltage corresponding to the output voltage, and arranged to;
- compare the feedback voltage to a reference waveform; and
- switch said first to fourth switching elements and the polarity switching element in dependence of said comparing, for generating the output voltage corresponding to the reference waveform.

13. The controller device as claimed in claim 12, wherein the controller device comprises the first switching element, the second switching element, the third switching element, the fourth switching element, and the polarity switching element.

14. The controller device as claimed in claim 12, wherein the controller device comprises the feedback element.

15. The controller device as claimed in claim 12, wherein the polarity switching element comprises a first and a second branch, each branch having a first on off type switch and a second on off type switch connected in series at a connection point, and the output voltage being provided between the connection points in the first and second branches.

16. The controller device as claimed in claim 12, wherein the controller device is arranged for operating said switch mode power supply in a pulse width modulation mode during a low voltage part of the reference waveform by, during at least one of said plurality of consecutive time periods more than two of said first to fourth switching elements being open, for providing the pulsed voltage having width modulated pulses.

17. The controller device as claimed in claim 12, wherein the controller device is arranged for adapting lengths of periods in said plurality of consecutive time periods in dependence of the reference waveform.

18. The controller device as claimed in claim 17, wherein the controller device is arranged for reducing the length of the periods in said plurality of consecutive time periods during a low voltage part of the reference waveform.

19. The controller device as claimed in claim 12, wherein the reference waveform is a sine wave.

\* \* \* \* \*